March 18, 1924.

O. H. GOETZ 1,487,557

AUTOMOBILE BUFFER BRACKET

Filed Aug. 30, 1922

Oscar H. Goetz
Inventor

By John H. Hilliard
Attorney

Patented Mar. 18, 1924.

1,487,557

UNITED STATES PATENT OFFICE.

OSCAR H. GOETZ, OF BRIDGEPORT, CONNECTICUT, ASSIGNOR TO AMERICAN CHAIN COMPANY, INC., A CORPORATION OF NEW YORK.

AUTOMOBILE BUFFER BRACKET.

Application filed August 30, 1922. Serial No. 585,144.

*To all whom it may concern:*

Be it known that I, OSCAR H. GOETZ, a citizen of the United States, residing at Bridgeport, in the county of Fairfield, State of Connecticut, United States of America, have invented certain new and useful Improvements in Automobile Buffer Brackets, of which the following, taken in connection with the accompanying drawing, is a specification.

The invention relates to brackets more particularly of the type adapted to be mounted on the upper surface of the forward end or horn of an automobile frame for the purpose of supporting a buffer thereon. Its object is to devise a bracket of this type which may be securely and firmly mounted, if desired, by means of a single separate fitting.

Referring to the drawings.

Figure 1:
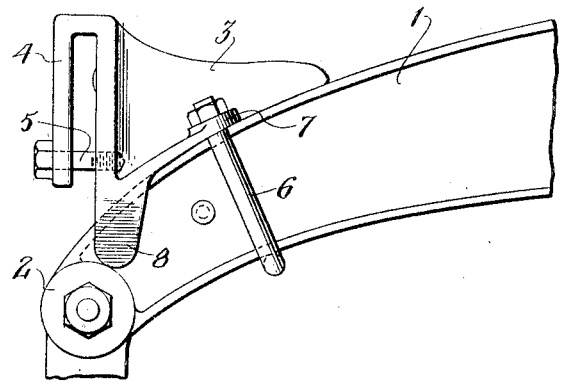
Figure 1 is a side view of one form of the bracket shown attached to an automobile frame.

The form of bracket shown in Figure 1 is shown in connection with a forward end 1 of a conventional type of automobile frame, terminating in an eye 2 which serves as a bearing for the spring bolt in the usual manner. As is more particularly shown in Figure 2, this eye 2 projects on each side of the frame 1 a sufficient distance to enable the projecting portions of the eye to serve as surfaces against which certain portions of the bracket may abut as is hereafter more particularly described. The bracket proper may consist of a block 3 adapted to lie on the upper surface of the frame 1 and terminating in a yoke 4, which may serve in connection with the bolt 5 to firmly support a buffer bar, or a supporting arm for a buffer bar, as may be desired. The bracket may be firmly retained against the upper surface of the frame 1 by means of a U-bolt 6 passing through the flanges 7. With the bracket retained only by this single U-bolt, it is obvious that it is subject to being easily displaced from its position on the upper surface of the frame either turning it about or by causing it to slide along the frame more particularly in the direction of the eye 2, the latter tendency being due to the fact that the automobile frame end tapers as it approaches the eye 2. In order to prevent these tendencies of the bracket, I provide the two ears 8 which depend on either side of the frame and are of suitable length to abut against the projecting ends of the eye 2 when the bracket is suitably placed.

Figure 2:
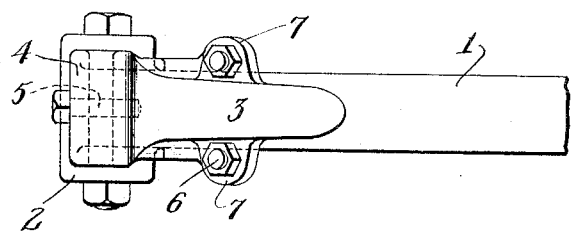
Figure 2 is a top view of the form shown in Figure 1.
Figure 3:
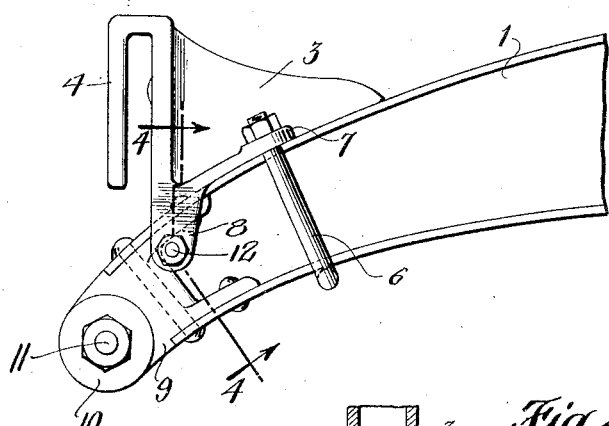
Figure 3 is a side view of another type of bracket shown mounted on a conventional form of automobile frame horn.
Figure 4:
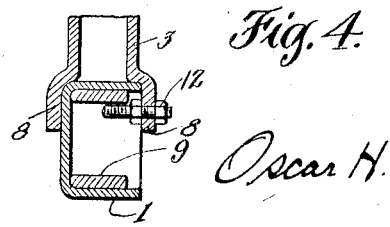
Figure 4 is a view in section of the lines 4—4 of Figure 3.

In the form shown in Figure 3 the frame end is provided with a forging 9 which terminates in an eye 10 which serves, as in the case of the form shown in Figures 1 and 2, as a bearing for the spring bolt 11. In the case of this form the bracket may be retained in fixed position and prevented from sliding in the direction of the taper of the frame, that is, in the direction of the eye 10, by the use of a screw 12 through the ear which depends on that side of the frame in which the forging is carried. The screw 12 is long enough to serve as an abutment against the forging 9, thus preventing the bracket from sliding in the direction of the eye 10 in spite of the taper of the frame. As in the case of the form shown in Figures 1 and 2, the bracket of Figures 3 and 4 is likewise prevented from being displaced laterally.

Having thus described my invention, I claim:

1. In an automobile buffer supporting bracket of the type adapted to be clamped on the upper surface of the frame horn, a pair of ears depending on each side of the frame and of sufficient length to abut against the spring bolt eye.

2. In an automobile buffer supporting bracket a block adapted to fit on the upper surface of an automobile frame horn, means for clamping a buffer bar to said block, said block being provided with ears depending therefrom on either side of the said frame and to abut against the spring bolt eye, and a U-bolt adapted to retain said block firmly against the upper surface of said frame horn.

3. In an automobile buffer supporting bracket of the type adapted to be clamped on the upper surface of the frame horn, a pair of ears depending on each side of the frame and adapted to contact with an abutting portion of said horn.

4. In an automobile buffer supporting bracket, a block adapted to fit on the upper surface of an automobile frame horn, means for clamping the buffer bar to said block, said block being provided with ears depending therefrom on either side of the said frame, one of said ears being provided with means adapted to abut against a portion of the said frame horn, and a U-bolt adapted to retain said block firmly against the upper surface of said frame horn.

In testimony whereof, I have signed this specification.

OSCAR H. GOETZ.